(12) United States Patent
Hellstrom et al.

(10) Patent No.: US 10,892,492 B2
(45) Date of Patent: Jan. 12, 2021

(54) METAL OXIDE CATHODE

(71) Applicant: Robert Bosch GmbH, Baden-Wuerttemberg (DE)

(72) Inventors: Sondra Hellstrom, Menlo Park, CA (US); Boris Kozinsky, Waban, MA (US); Jake Christensen, Elk Grove, CA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/392,903

(22) Filed: Dec. 28, 2016

(65) Prior Publication Data

US 2017/0194651 A1 Jul. 6, 2017

Related U.S. Application Data

(60) Provisional application No. 62/272,887, filed on Dec. 30, 2015, provisional application No. 62/356,877, filed on Jun. 30, 2016.

(51) Int. Cl.
| | |
|---|---|
| *H01M 10/052* | (2010.01) |
| *H01M 4/86* | (2006.01) |
| *H01M 4/36* | (2006.01) |
| *H01M 4/50* | (2010.01) |
| *H01M 4/48* | (2010.01) |
| *C01G 1/02* | (2006.01) |
| *H01M 4/38* | (2006.01) |
| *H01M 4/88* | (2006.01) |

(Continued)

(52) U.S. Cl.
CPC ............ *H01M 4/8605* (2013.01); *C01G 1/02* (2013.01); *H01M 4/366* (2013.01); *H01M 4/382* (2013.01); *H01M 4/48* (2013.01); *H01M 4/50* (2013.01); *H01M 4/8657* (2013.01); *H01M 4/88* (2013.01); *H01M 4/9016* (2013.01); *H01M 10/052* (2013.01); *H01M 12/08* (2013.01); *C01P 2004/34* (2013.01); *C01P 2004/62* (2013.01); *C01P 2004/64* (2013.01); *C01P 2006/14* (2013.01); *H01M 2004/027* (2013.01); *H01M 2004/8689* (2013.01); *Y02E 60/10* (2013.01)

(58) Field of Classification Search
CPC .............................. H01M 4/366; H01M 4/382
See application file for complete search history.

(56) References Cited

U.S. PATENT DOCUMENTS

| | | | |
|---|---|---|---|
| 6,558,847 B1 * | 5/2003 | Kawakami | ............ H01M 4/131 423/618 |
| 8,883,358 B2 | 11/2014 | Takahashi et al. | |

(Continued)

FOREIGN PATENT DOCUMENTS

EP     1207572     5/2002

OTHER PUBLICATIONS

Yim et al. (Journal of Power Sources 205 (2012) 414-419).*

(Continued)

*Primary Examiner* — Olatunji A Godo
(74) *Attorney, Agent, or Firm* — Michael Best & Friedrich LLP

(57) ABSTRACT

An essentially carbon-free cathode for a lithium/air secondary battery and methods for making are provided. The cathode includes a hollow porous conductive metal oxide particle such as indium tin oxide, an optional functional layer, and an electrically conductive binder.

12 Claims, 4 Drawing Sheets

(51) Int. Cl.
H01M 4/90 (2006.01)
H01M 12/08 (2006.01)
H01M 4/02 (2006.01)

(56) References Cited

U.S. PATENT DOCUMENTS

| | | | |
|---|---|---|---|
| 9,005,816 B2 | 4/2015 | Amine et al. | |
| 9,093,717 B2 | 7/2015 | Sakamoto et al. | |
| 2003/0039887 A1* | 2/2003 | Yun | H01M 4/0402 |
| | | | 429/218.1 |
| 2004/0131934 A1 | 7/2004 | Sugnaux et al. | |
| 2006/0127749 A1* | 6/2006 | Christie | B22F 3/11 |
| | | | 429/121 |
| 2009/0136816 A1* | 5/2009 | Kang | B01J 13/22 |
| | | | 13/22 |
| 2010/0068623 A1* | 3/2010 | Braun | C25F 3/02 |
| | | | 429/219 |
| 2010/0258759 A1* | 10/2010 | Archer | B82Y 30/00 |
| | | | 252/62.56 |
| 2011/0312080 A1 | 12/2011 | Hatton et al. | |
| 2013/0101907 A1 | 4/2013 | Takahashi et al. | |
| 2013/0177838 A1* | 7/2013 | Wang | B01J 23/52 |
| | | | 429/524 |
| 2013/0209888 A1* | 8/2013 | Nagai | H01M 4/131 |
| | | | 429/231.1 |
| 2013/0216915 A1 | 8/2013 | Affinito et al. | |
| 2013/0224593 A1 | 8/2013 | Visco et al. | |
| 2013/0266856 A1 | 10/2013 | Ryhanen et al. | |
| 2013/0344416 A1 | 12/2013 | Sakamoto et al. | |
| 2014/0220459 A1 | 8/2014 | Iida et al. | |
| 2014/0287305 A1 | 9/2014 | Wachsman et al. | |
| 2014/0308594 A1 | 10/2014 | Dudney et al. | |
| 2014/0356737 A1 | 12/2014 | Song | |
| 2015/0118582 A1 | 4/2015 | Badding et al. | |
| 2015/0179356 A1 | 6/2015 | Gardner et al. | |

OTHER PUBLICATIONS

Hara et al. (Journal of Power Sources 189 (2009) 485-4897).*

Park Jin-Bum et al: A carbon-free ruthenium oxide/mesoporous titanium dioxide electrode for lithium-oxygen batteries 11 , Journal of Power Sources, vol. 295, Jul. 16, 2015 (Jul. 16, 2015), pp. 299-304.

Arjun Kumar Thapa et al: Mesoporous—MnO/Pd catalyst air electrode for rechargeable lithiumair battery11 , Journal of Power Sources, Elsevier SA, CH, vol. 196, No. 16, Sep. 29, 2010 (Sep. 29, 2010), pp. 7016-7020.

International Search Report an Written Opinion for Application No. PCT/EP2016/081827 dated Mar. 10, 2017 (12 pages).

International Preliminary Report on Patentability for Application No. PCT/EP2016/081827 dated Jun. 3, 2018 (9 pages).

European Patent Office Action for Application No. 16822663.7 dated Sep. 16, 2019 (9 pages).

Liu et al., Enhancing the Electrochemical Performance of the LiMn2O4 Hollow Microsphere Cathode with a LiNi0.5Mn1.5O4 Coated Layer, Chemistry—A European Journal, Jan. 13, 2014, vol. 20, No. 3, pp. 824-830.

Janotti et al., "Fundamentals of zinc oxide as a semiconductor", Reports on Progress in Physics, 2009, 29 pages.

Ottakam Thotiyl et al., "A stable cathode for the aprotic Li-O2 battery", Nature Materials, vol. 12, Nov. 2013, pp. 1050-1056.

Wu et al., "Surface modification of indium tin oxide by plasma treatment: An effective method to improve the efficiency, brightness, and reliability of organic light emitting devices", Appl. Phys. Letters, vol. 70, No. 11, Mar. 1997, 3 pages.

Zhang et al., "Al-doped ZnO inverse opal networks as efficient electron collectors in BiVO4 photoanodes for solar water oxidation", Energy and Environmental Science, vol. 7, 2014, pp. 1402-1408.

Sun et al., "Ruthenium nanocrystals as cathode catalysts for lithium-oxygen batteries with a superior performance", Scientific Reports, published Jul. 22, 2013 (7 pages).

Peng et al., "A Reversible and Higher-Rate Li-O2 Battery", Science, vol. 337, Aug. 3, 2012, pp. 563-566.

Zhang et al., "Al-doped ZnO inverse opal networks as efficient electron collectors in BiVO4 photoanodes for solar water oxidation", Energy & Environmental Science, 2014, vol. 7, pp. 1402-1408.

* cited by examiner

METAL OXIDE CATHODE

CROSS-REFERENCE TO RELATED APPLICATIONS

This application claims priority to U.S. Provisional Application No. 62/272,887 filed Dec. 30, 2015, and U.S. Provisional Application No. 62/356,877, filed Jun. 30, 2016, the entire contents of which are hereby incorporated by reference.

FIELD

The invention generally relates to cathodes for secondary batteries, and more particularly to a porous metal oxide cathode for a lithium-air battery.

BACKGROUND

Rechargeable lithium batteries are attractive energy storage devices for portable electric and electronic devices and electric and hybrid-electric vehicles because of their high specific energy compared to other electrochemical energy storage devices. A typical lithium cell contains a negative electrode, a positive electrode, and a separator located between the negative and positive electrodes. Both electrodes contain active materials that react with lithium reversibly. In some cases, the negative electrode may include lithium metal, which can be electrochemically dissolved and deposited reversibly. The separator contains an electrolyte with a lithium cation, and serves as a physical barrier between the electrodes such that none of the electrodes are electrically connected within the cell.

Typically, during charging, there is generation of electrons at the positive electrode and consumption of an equal amount of electrons at the negative electrode. During discharging, opposite reactions occur.

During repeated charge/discharge cycles of the battery undesirable side reactions occur. These undesirable side reactions result in the reduction of the capacity of the battery to provide and store power.

A typical lithium/air battery cell includes gas-diffusion electrodes based on porous carbon materials (e.g., carbon black, graphite, graphene, carbon fibers or carbon nanotubes). The carbon materials undergo oxidation during the charge cycle, because of the harsh environment in the cell. These include formation of pure oxygen, superoxide, and peroxide ions, formation of solid lithium peroxide on the cathode surface, and electrochemical oxidation potentials greater than 3 volts (vs. Li/Li$^+$). The oxidation of the carbon material in combination with the presence of lithium ions leads to the formation of a surface layer of insulating lithium carbonate ($Li_2CO_3$) on the cathode. The oxidation reaction and the surface layer cause an increasing charging resistance of the cell resulting in charge potentials greater than 4 volts (vs. Li/Li$^+$). This can reduce the charging efficiency and in some cases prevent the cell from being fully recharged. Additionally, the presence of decomposing carbon in a lithium/air battery can also cause the formation of peroxycarbonate ions, which can substantially degrade many electrolytes.

SUMMARY

Recently, attempts have been made to eliminate carbon from the cathode. Materials, such as nanoporous gold and titanium carbide, have met with limited success due to high cost and oxidation respectively. What is therefore needed is an inexpensive, processable, conductive, carbon-free thin film cathode that is minimally reactive to oxygen.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to systems and methods for a cathode which is essentially free of oxidizable carbon.

In one embodiment, the disclosure provides a cathode comprising: a porous conductive metal oxide particle, wherein the cathode is essentially free of oxidizable carbon.

In another embodiment, the disclosure provides a method of making a cathode comprising: forming a dispersion of polystyrene beads; adding a metal oxide precursor; forming a sol-gel; depositing the sol-gel onto a support; and removing the polystyrene beads.

The details of one or more features, aspects, implementations, and advantages of this disclosure are set forth in the accompanying drawings, the detailed description, and the claims below.

DETAILED DESCRIPTION

One or more specific embodiments will be described below. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
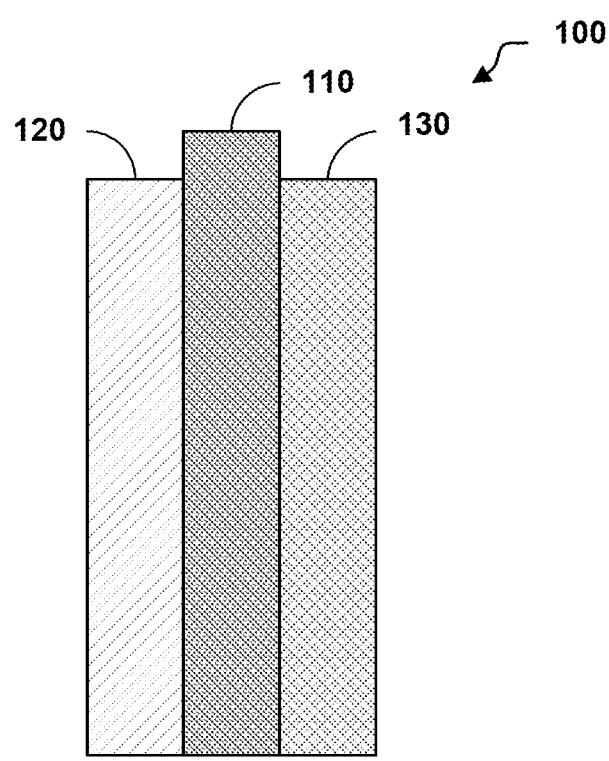
FIG. 1 is a schematic diagram illustrating a cathode electrode including a metal foil and conductive metal oxide particles, in accordance with some embodiments.

An embodiment of a cathode 100 is shown in FIG. 1. In the example of FIG. 1 the cathode 100 may be essentially free of oxidizable carbon (e.g., carbon, carbon black, graphite) comprising a metal foil 110 having a first side and a second side, and a first cathode layer 120 comprising a porous electrically and ionically conductive material deposited on the first side of the metal foil 110. The metal foil 110 may additionally be coated on the second side with a second cathode layer 130 comprising a porous conductive material. The porous material may be electrically and/or ionically conductive. The thicknesses and compositions of the first cathode layer 120 and second cathode layer 130 may be same or different. In a further embodiment, the composition of the first cathode layer 120 and second cathode layer 130 are the same. In an alternate embodiment, the metal foil 110 of the cathode 100 may be replaced with a temporary support material (e.g., a soluble polymer (e.g., polystyrene, polyethylene oxide, polyvinyl alcohol)) which facilitates the deposition of the first cathode layer 120 and is then subsequently removed using a solvent (e.g., water, chlorinated solvents (e.g., chloroform), aromatic solvents (e.g., toluene)). Further cathode layers may optionally be deposited. In some embodiments, the first cathode layer 120 and/or second cathode layer 130 additionally comprises a binder (e.g., polyvinylidene fluoride). In some embodiments, the first cathode layer 120 and/or second cathode layer 130 additionally comprises a functional layer (e.g., a catalyst). In some embodiments, essentially free of oxidizable carbon may be less than about 3 volume percent of oxidizable carbon, less than about 1 volume percent of oxidizable carbon, less than about 0.5 volume percent of oxidizable carbon, less than about 0.3 volume percent of oxidizable carbon, or less than about 0.1 volume percent of oxidizable carbon, based on the total volume of the cathode.

Figure 2:
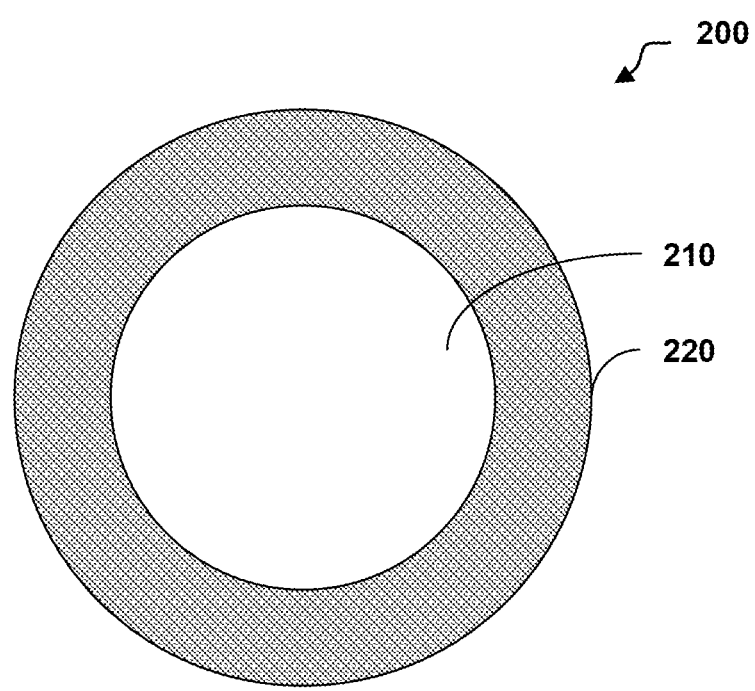
FIG. 2 is a schematic diagram illustrating a pore-shell metal oxide particle, in accordance with some embodiments.

In some embodiments, the porous conductive material may comprise a porous conductive metal oxide particle 200 of FIG. 2. The porous conducting metal oxide particle 200 comprises a pore-shell structure in which the pore 210 is hollow and the shell 220 comprises a film of a conductive metal oxide. The amount of hollow volume defines the porosity of the porous conducting metal oxide particle 200. The porosity of the porous conducting metal oxide particle 200 is the volume percent void space based on the total volume of the particle. During battery operation the hollow pore 210 allows the formation and deposition/storage of oxidation products such as lithium peroxide ($Li_2O_2$) formed during the discharge of the battery. The ability to deposit the oxidation product directly determines the maximum power obtainable from a battery. The shell 220 of the porous conductive metal oxide particle 200 comprises a conductive metal oxide film.

Suitable metal oxides include, but are not limited to, zinc oxides, tin oxides, nickel oxides, manganese oxides, iron oxides, vanadium oxides, ruthenium oxides, rhenium oxides, iridium oxides, indium oxides, aluminum oxides, and combinations thereof. In certain embodiments, the conductive metal oxide comprises indium tin oxide, indium zinc oxide, or aluminum zinc oxide.

In various embodiments, the thickness of the shell 220 may be at least about 1 nanometer, at least about 2 nanometers, at least about 3 nanometers, at least about 4 nanometers, at least about 5 nanometers, less than about 50 nanometers, less than about 40 nanometers, less than about 30 nanometers, less than about 20 nanometers, less than about 15 nanometers, less than about 10 nanometers, or less than about 7 nanometers.

In various embodiments, the shape of the porous conducting metal oxide particle 200 may be an opal, inverse opal, sphere, spherical, oblate spheroid, prolate spheroid, teardrop, and combinations thereof.

In some embodiments, the diameter of the porous conducting metal oxide particle 200 may be at least about 40 nanometers, at least about 50 nanometers, at least about 60 nanometers, at least about 70 nanometers, at least about 80 nanometers, less than about 400 nanometers, less than about 300 nanometers, less than about 200 nanometers, less than about 150 nanometers, or less than about 100 nanometers.

In some embodiments, the porosity of the porous conducting metal oxide particle 200 may be at least about 40 volume percent, at least about 50 volume percent, at least about 60 volume percent, at least about 70 volume percent, or at least about 80 volume percent.

Figure 3:
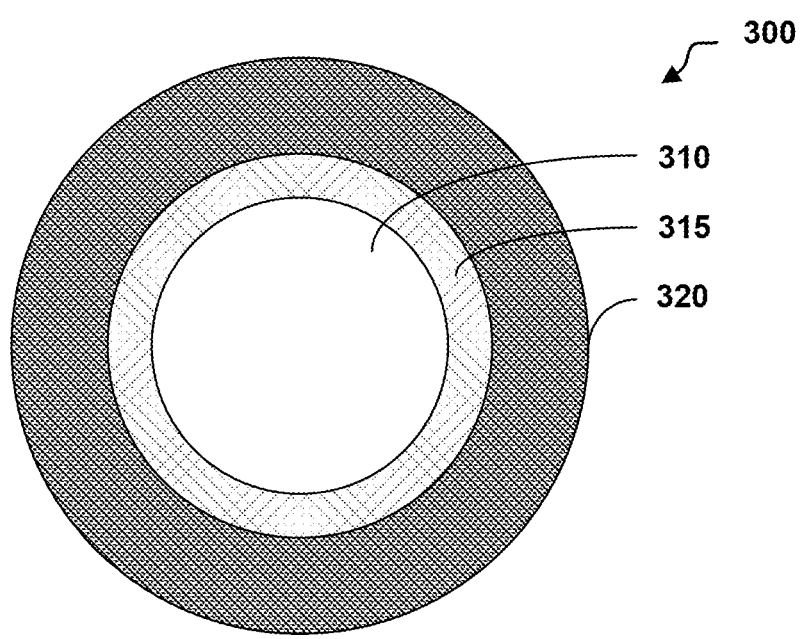
FIG. 3 is a schematic diagram illustrating a pore-shell metal oxide particle with a functional layer, in accordance with some embodiments.

FIG. 3 depicts another embodiment of a porous conducting metal oxide particle 300. The porous conducting metal oxide particle 300 comprises a pore-shell structure in which the pore 310 is hollow and the shell 320 comprises a film of a conductive metal oxide. The pore 310 is the same as described for the pore 210 above. The shell 320 is the same as described for shell 220 above. The porous conducting metal particle 300 additionally comprises a functional layer 315 on an internal face of the shell 320. The functional layer 315 may comprise one or more functional materials as a mixture, a plurality of sub-layers, and combinations thereof. The materials of the functional layer may impart various functionality to the porous conducting metal oxide particle 300 to promote or inhibit various physical, chemical, or electrochemical processes in the electrode (e.g., wettability, non-wettability, catalysis). In certain embodiments, the functional layer includes a catalyst (e.g., α-manganese oxide, manganese, cobalt, ruthenium, platinum, silver, and combinations thereof). In certain embodiments, the functional layer includes a material that imparts non-wettability (hydrophobicity) (e.g., alkyl silanes). In certain embodiments, the functional layer includes a material that imparts wettability (hydrophilicity). In various embodiments, the thickness of the functional layer 315 may be at least about 0.5 nanometers, at least about 1.0 nanometers, at least about 1.5 nanometers, at least about 2.0 nanometers, at least about 3.0 nanometers, at least about 4.0 nanometers, at least about 5.0 nanometers, less than about 40 nanometers, less than about 30 nanometers, less than about 20 nanometers, less than about 15 nanometers, less than about 10 nanometers, or less than about 7.0 nanometers.

In some embodiments, the cathode 100 may comprise a plurality of different porous conducting metal oxide particles 200 and/or 300. The particles may comprise the same or different metal oxides, the same or different functional layers, the same or different shapes, the same or different diameters, and combinations thereof. In certain embodiments, the cathode 430 comprises a first porous conductive metal oxide particle 300 having a first functional layer 315 and a second porous conductive metal oxide particle 300 having a second functional layer 315. In one embodiment the cathode 100 comprises a first porous conducting metal oxide particle 300 having a non-wetting functional layer 315 and a second porous conducting metal oxide particle 300 having a catalyst functional layer 315.

In embodiments, the cathode 100 may be fabricated by a sol-gel process comprising forming a dispersion of polystyrene beads; combining the dispersion with a metal oxide (e.g., zinc oxide) precursor; forming a sol-gel by gelation; and depositing the sol-gel on a perforated metal foil or removable support. The suspension can then be dried to create a lattice of hexagonally closest packed polystyrene spheres having a metal oxide film coating. The polystyrene and removable support (if present) are then removed by dissolution or thermal decomposition. A binder, if desired, may be added to the metal oxide particles 200 before or after the dissolution of the polystyrene spheres. Alternatively, the polystyrene spheres can be sedimented prior to coating with a metal oxide precursor. In embodiments, metal oxides particles may be formed by the technique described by Zhang et al., *Energy Environ. Sci.* 2014, 7, 1402-1408, which teaches a self-induced assembly of polystyrene spheres on a substrate, infiltration with metal oxide precursors, followed by removal of the polystyrene spheres and crystallization of the metal oxide by annealing, the contents of which are hereby incorporated by reference in their entirety. In other embodiments, the metal oxide particles 300 comprise a functional layer 315. The functional layer 315 can be deposited on the polystyrene beads prior to treatment with the metal oxide precursor.

In various embodiments, the proportions of binder to porous conductive metal oxide particles 200, 300 can be varied to achieve the desired porosity of the cathode 100. In some embodiments, the binder is present in the amount of about 5 to about 70 volume percent and the porous conductive metal oxide particles 200, 300 are present in the amount of about 30 to about 95 percent by volume based on the total volume of the cathode 100.

Figure 4:
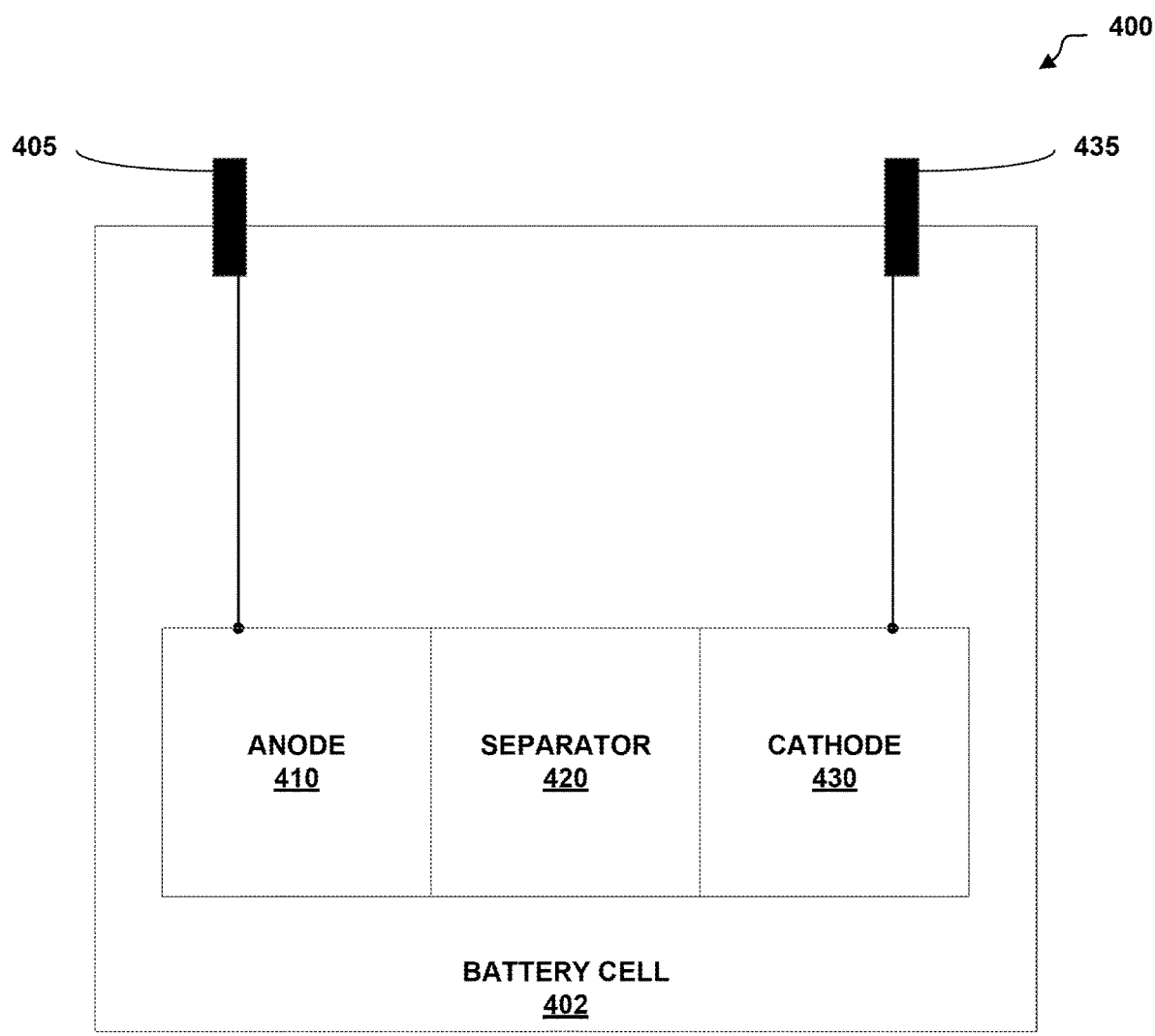
FIG. 4 is a schematic diagram illustrating a battery including a battery cell, in accordance with some embodiments.

An embodiment of a battery 400 is shown in FIG. 4. The battery 400 includes a battery cell 402, an anode current collector 405, an anode 410, a separator 420, a cathode 430, and a cathode current collector 435. In various examples, the anode 410 comprises an oxidizable metal (e.g., lithium). In various examples, suitable materials for the separator 420 may include porous polymers, ceramics, and two dimensional sheet structures such as graphene, boron nitride, and dichalcogenides. In various examples the cathode 430 may comprise the cathode 100 of FIG. 1.

In some examples the cathode 430, separator 420, and anode 410 comprise an ionically conductive electrolyte that contains a salt, such as lithium hexafluorophosphate ($LiPF_6$) that provides the electrolyte with an adequate conductivity which reduces the internal electrical resistance of the battery cell. In embodiments, the cathode 430, can contain a lithium ion conducting ceramic (e.g., garnet).

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

It is believed that embodiments described herein and many of their attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A battery comprising:
 a) an anode;
 b) a separator; and
 c) a cathode comprising a porous material comprising:
 a conductive metal oxide particle comprising an internal surface defining a hollow pore, and a functional layer deposited on the internal surface;
 wherein the cathode is essentially free of an oxidizable carbon; and
 wherein the battery is a lithium/air secondary battery.

2. The battery of claim 1, wherein the conductive metal oxide particle exhibits a shape selected from the list consisting of an opal, inverse opal, sphere, spherical, oblate spheroid, prolate spheroid, teardrop, and combinations thereof.

3. The battery of claim 2, wherein a diameter of the conductive metal oxide particle is about 40 nanometers to about 400 nanometers.

4. The battery of claim 1, wherein the conductive metal oxide particle has a porosity of at least about 60 percent by volume based on the total volume of the particle.

5. The battery of claim 1, wherein the conductive metal oxide particle comprises a metal oxide selected from the list consisting of a zinc oxide, a tin oxide, a nickel oxide, a manganese oxide, an iron oxide, a vanadium oxide, a ruthenium oxide, a rhenium oxide, an iridium oxide, an indium oxide, and combinations thereof.

6. The battery of claim 5, wherein the conductive metal oxide particle comprises indium tin oxide, indium zinc oxide, or aluminum zinc oxide.

7. The battery of claim 1, wherein the functional layer comprises α-manganese oxide.

8. The battery of claim 1, wherein the functional layer comprises a catalyst, a wetting agent, or a non-wetting agent.

9. The battery of claim 8, wherein the functional layer comprises a non-wetting agent.

10. The battery of claim 1, wherein the cathode further comprises a binder.

11. The battery of claim 1, wherein the cathode comprises a plurality of conductive metal oxide particles, and wherein the cathode comprises about 30 to about 95 volume percent conductive metal particles and about 5 to about 70 volume percent binder based on the total volume of the cathode.

12. The battery of claim 1, wherein the cathode comprises a plurality of conductive metal oxide particles, including a first conductive metal oxide particle having a first functional layer and a second conductive metal oxide particle having a second functional layer.

* * * * *